US012621828B2

(12) United States Patent
Guo

(10) Patent No.: US 12,621,828 B2
(45) Date of Patent: May 5, 2026

(54) APPARATUS AND METHOD OF WIRELESS COMMUNICATION

(71) Applicant: GUANGDONG OPPO MOBILE TELECOMMUNICATIONS CORP., LTD., Dongguan (CN)

(72) Inventor: Li Guo, Allen, TX (US)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 744 days.

(21) Appl. No.: 18/147,666

(22) Filed: Dec. 28, 2022

(65) Prior Publication Data

US 2023/0171771 A1 Jun. 1, 2023

Related U.S. Application Data

(63) Continuation of application No. PCT/CN2021/107957, filed on Jul. 22, 2021.

(60) Provisional application No. 63/076,514, filed on Sep. 10, 2020.

(51) Int. Cl.
*H04W 16/28* (2009.01)
*H04W 72/1268* (2023.01)
*H04W 72/23* (2023.01)

(52) U.S. Cl.
CPC ....... *H04W 72/1268* (2013.01); *H04W 16/28* (2013.01); *H04W 72/23* (2023.01)

(58) Field of Classification Search
CPC ... H04L 5/0094; H04L 1/0031; H04L 5/0053; H04W 72/23; H04W 72/1268; H04W 16/28

See application file for complete search history.

(56) References Cited

U.S. PATENT DOCUMENTS

| | | | |
|---|---|---|---|
| 2019/0103908 A1 | 4/2019 | Yu et al. | |
| 2020/0119875 A1 | 4/2020 | John Wilson et al. | |
| 2020/0221485 A1 | 7/2020 | Cirik et al. | |
| 2024/0032025 A1* | 1/2024 | Gao ................... | H04W 72/232 |
| 2024/0324026 A1* | 9/2024 | Gao ................... | H04B 7/06964 |

FOREIGN PATENT DOCUMENTS

| | | |
|---|---|---|
| CN | 110073609 A | 7/2019 |
| CN | 111586862 A | 8/2020 |

OTHER PUBLICATIONS

ZTE, "Enhancements on Multi-beam Operation", 3GPP TSG RAN WG1 Meeting #102-e R1-2005454, e-Meeting, Aug. 17-28, 2020. International Search Report in the international application No. PCT/CN2021/107957, mailed on Oct. 26, 2021.

(Continued)

*Primary Examiner* — Anez C Ebrahim
(74) *Attorney, Agent, or Firm* — PERKINS COIE LLP

(57) ABSTRACT

An apparatus and a method of wireless communication are provided. The method by a user equipment (UE) includes being configured, by a base station, with a configuration of one or more transmission configuration indicator (TCI) states, wherein each TCI state includes one or more reference signals for a reception of downlink channels or signals and/or for a transmission of uplink channels or signals, and in each TCI state, being provided with at least one of configuration parameters.

19 Claims, 4 Drawing Sheets

200

202

Being configured, by a base station, with a configuration of one or more transmission configuration indicator (TCI) states, wherein each TCI state comprises one or more reference signals for a reception of downlink channels or signals and/or for a transmission of uplink channels or signals

204

In each TCI state, being provided with at least one of configuration parameters

(56)                References Cited

OTHER PUBLICATIONS

Written Opinion of the International Search Authority in the international application No. PCT/CN2021/107957, mailed on Oct. 26, 2021.
3GPP TS 38.211 V16.2.0, "3rd Generation Partnership Project; Technical Specification Group Radio Access Network; NR; Physical channels and modulation (Release 16)", Technical Specification, (Jun. 2020).
3GPP TS 38.212 V16.2.0, "3rd Generation Partnership Project; Technical Specification Group Radio Access Network; NR; Multiplexing and channel coding (Release 16)", Technical Specification, (Jun. 2020).
3GPP TS 38.213 V16.2.0, "3rd Generation Partnership Project; Technical Specification Group Radio Access Network; NR; Physical layer procedures for control (Release 16)", Technical Specification, (Jun. 2020).
3GPP TS 8.214 V16.2.0, "3rd Generation Partnership Project; Technical Specification Group Radio Access Network; NR; Physical layer procedures for data (Release 16)", Technical Specification, (Jun. 2020).
3GPP TS 38.211 V16.0.0, "3rd Generation Partnership Project; Technical Specification Group Radio Access Network; NR; Physical channels and modulation (Release 16)", Technical Specification, (Dec. 2019).
3GPP TS 38.212 V16.0.0, "3rd Generation Partnership Project; Technical Specification Group Radio Access Network; NR; Multiplexing and channel coding (Release 16)", Technical Specification, (Dec. 2019).
3GPP TS 38.213 V16.0.0, "3rd Generation Partnership Project; Technical Specification Group Radio Access Network; NR; Physical layer procedures for control (Release 16)", Technical Specification, (Dec. 2019).
3GPP TS 38.214 V16.0.0, "3rd Generation Partnership Project; Technical Specification Group Radio Access Network; NR; Physical layer procedures for data (Release 16)", Technical Specification, (Dec. 2019).
3GPP TS 38.215 V16.0.0, "3rd Generation Partnership Project; Technical Specification Group Radio Access Network; NR; Physical layer measurements (Release 16)", Technical Specification, (Dec. 2019).
3GPP TS 38.321 V16.0.0, "3rd Generation Partnership Project; Technical Specification Group Radio Access Network; NR; Medium Access Control (MAC) protocol specification (Release 16)", Technical Specification, (Mar. 2020).
3GPP TS 38.331 V16.0.0, "3rd Generation Partnership Project; Technical Specification Group Radio Access Network; NR; Radio Resource Control (RRC) protocol specification (Release 16)", Technical Specification, (Mar. 2020).
ZTE: "Preliminary views on further enhancement for NR MIMO", 3GPP Draft; R1-2003483,3rd Generation Partnership Project (3GPP), Mobile Competence Centre; 650, Route Des Lucioles ; F-06921 Sophia-Antipolis Cedex; France vol. RAN WG1, No. e-Meeting; May 25, 2020-Jun. 5, 2020, May 16, 2020 (May 16, 2020), XP052344790,paragraphs [0002],[0003], 18 pages.
OPPO: "Enhancements on beam management for multi-TRP", 3GPP Draft; R1-2005986, 3rd Generation Partnership Project (3GPP), Mobile Competence Centre ; 650, Route Des Lucioles ; F-06921 Sophia-Antipolis Cedex ; France vol. RAN WG1, No. e-Meeting; Aug. 17, 2020-Aug. 28, 2020, Aug. 7, 2020 (Aug. 7, 2020), XP052347360, paragraph [0004], 3 pages.
Spreadtrum Communications: "Discussion on enhancements on beam management for multi-TRP", 3GPP Draft; R1-2006260, 3rd Generation Partnership Project (3GPP), Mobile Competence Centre; 650, Route Des Lucioles ; F-06921 Sophia-Antipolis Cedex; France vol. RAN WG1, No. e-Meeting; Aug. 17, 2020-Aug. 28, 2020, Aug. 8, 2020 (Aug. 8, 2020), XP052347634, paragraph [0002], 4 pages.
Supplementary European Search Report in the European application No. 21865706.2, mailed on Oct. 19, 2023, 9 pages.

* cited by examiner

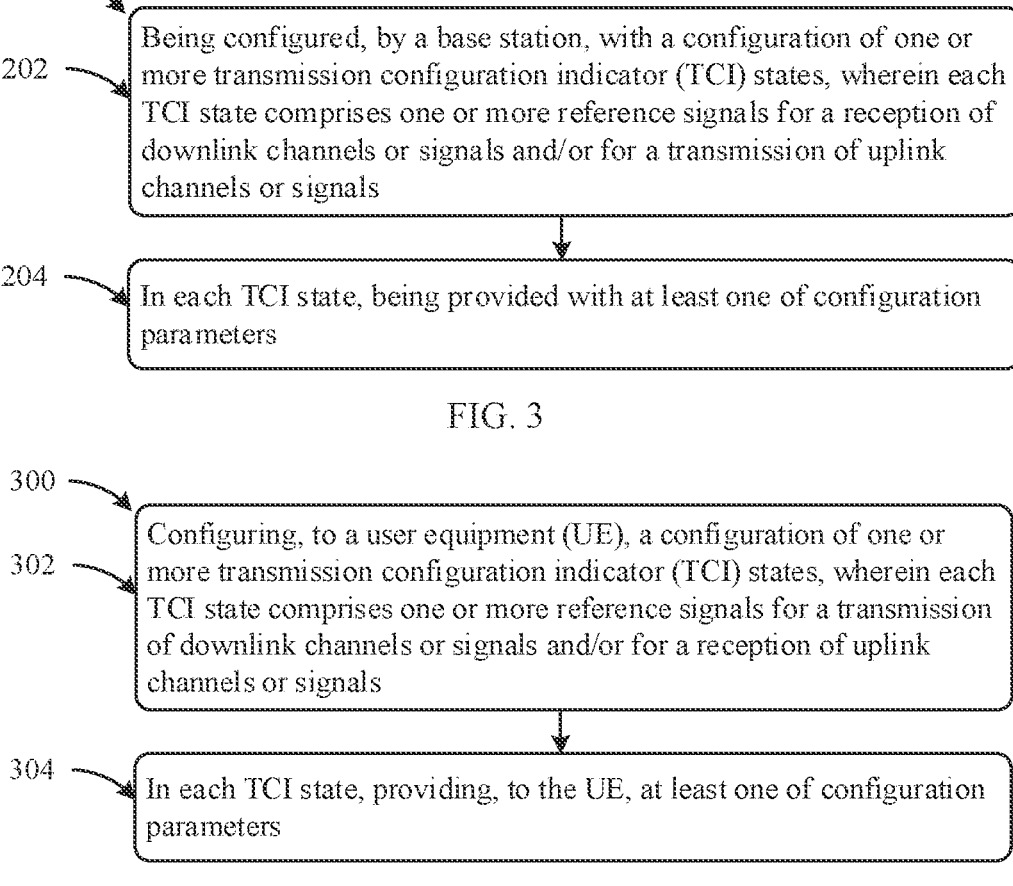

200

202 Being configured, by a base station, with a configuration of one or more transmission configuration indicator (TCI) states, wherein each TCI state comprises one or more reference signals for a reception of downlink channels or signals and/or for a transmission of uplink channels or signals 204 In each TCI state, being provided with at least one of configuration parameters

302 Configuring, to a user equipment (UE), a configuration of one or more transmission configuration indicator (TCI) states, wherein each TCI state comprises one or more reference signals for a transmission of downlink channels or signals and/or for a reception of uplink channels or signals 304 In each TCI state, providing, to the UE, at least one of configuration parameters

FIG. 4

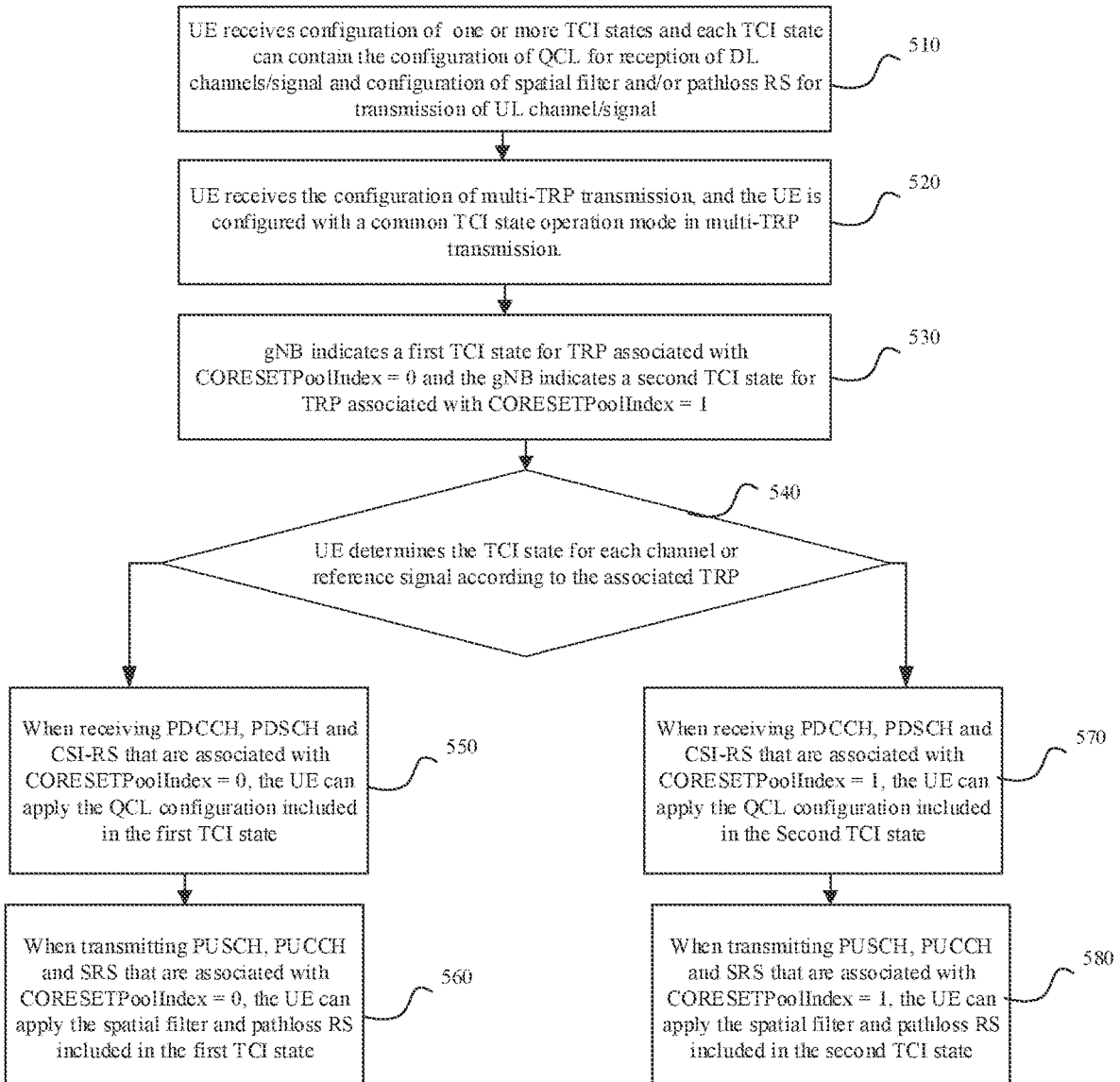

UE receives configuration of one or more TCI states and each TCI state can contain the configuration of QCL for reception of DL channels/signal and configuration of spatial filter and/or pathloss RS for transmission of UL channel/signal ⌇ 510

UE receives the configuration of multi-TRP transmission, and the UE is configured with a common TCI state operation mode in multi-TRP transmission. ⌇ 520 gNB indicates a first TCI state for TRP associated with CORESETPoolIndex = 0 and the gNB indicates a second TCI state for TRP associated with CORESETPoolIndex = 1 ⌇ 530

UE determines the TCI state for each channel or reference signal according to the associated TRP ⌇ 540

When receiving PDCCH, PDSCH and CSI-RS that are associated with CORESETPoolIndex = 0, the UE can apply the QCL configuration included in the first TCI state ⌇ 550

When receiving PDCCH, PDSCH and CSI-RS that are associated with CORESETPoolIndex = 1, the UE can apply the QCL configuration included in the Second TCI state ⌇ 570

When transmitting PUSCH, PUCCH and SRS that are associated with CORESETPoolIndex = 0, the UE can apply the spatial filter and pathloss RS included in the first TCI state ⌇ 560

When transmitting PUSCH, PUCCH and SRS that are associated with CORESETPoolIndex = 1, the UE can apply the spatial filter and pathloss RS included in the second TCI state ⌇ 580

APPARATUS AND METHOD OF WIRELESS COMMUNICATION

CROSS REFERENCE TO RELATED APPLICATIONS

This application is a continuation application of International Patent Application No. PCT/CN2021/107957, filed on Jul. 22, 2021, which is based on and claims priority from U.S. Patent Application No. 63/076,514, filed on Sep. 10, 2020, the disclosures of which are hereby incorporated by reference in their entirety.

BACKGROUND OF DISCLOSURE

1. Field of the Disclosure

The present disclosure relates to the field of communication systems, and more particularly, to an apparatus and a method of wireless communication, which can provide a good communication performance and/or high reliability.

2. Description of the Related Art

New radio (NR) system introduces a multi-transmission/reception point (TRP) based non-coherent joint transmission. Multiple TRPs are connected through backhaul link for coordination. The backhaul link can be ideal or non-ideal. In the case of ideal backhaul, the TRPs can exchange dynamic physical downlink shared channel (PDSCH) scheduling information with short latency and thus different TRPs can coordinate a PDSCH transmission per PDSCH transmission. While, in non-ideal backhaul case, the information exchange between TRPs has large latency and thus the coordination between TRPs can only be semi-static or static.

NR/5G system supports multi-beam operation on downlink and uplink physical channels and reference signals. The use case for supporting the multi-beam operation mainly is for deployment of high-frequency band system, where high-gain analog beamforming is used to combat large path loss.

In current designs, a main drawback of multi-operation in multi-TRP systems is large signaling overhead and latency of beam switching operation. A beam indication is signaled for per control resource set (CORESET) of each TRP. The beam indication is per physical uplink control channel (PUCCH) resource. The beam indication is per physical uplink shared channel (PUSCH) and per PDSCH. Large number of medium access control (MAC) control element (CE) signaling commands are needed to switch beams of all downlink (DL) channels, uplink (UL) channels and reference signals. The consequence is reduced system capacity and enlarged beam switch latency.

Therefore, there is a need for an apparatus (such as a user equipment (UE) and/or a base station) and a method of wireless communication, which can solve issues in the prior art, reach a good balance between a resource overhead and a good positioning performance in a system deployment, improve a system capacity, improve a beam switch latency, provide a good communication performance, and/or provide high reliability.

SUMMARY

Embodiments of the present disclosure provide an apparatus (such as a user equipment (UE) and/or a base station) and a method of wireless communication.

In a first aspect of the present disclosure, a method of wireless communication by a user equipment (UE) comprises being configured, by a base station, with a configuration of one or more transmission configuration indicator (TCI) states, wherein each TCI state comprises one or more reference signals for a reception of downlink channels or signals and/or for a transmission of uplink channels or signals, and in each TCI state, being provided with at least one of configuration parameters.

In a second aspect of the present disclosure, a method of wireless communication by a base station comprises configuring, to a user equipment (UE), a configuration of one or more transmission configuration indicator (TCI) states, wherein each TCI state comprises one or more reference signals for a transmission of downlink channels or signals and/or for a reception of uplink channels or signals, and in each TCI state, providing, to the UE, at least one of configuration parameters.

In a third aspect of the present disclosure, a user equipment comprises a memory, a transceiver, and a processor coupled to the memory and the transceiver. The processor is configured, by a base station, with a configuration of one or more transmission configuration indicator (TCI) states, wherein each TCI state comprises one or more reference signals for a reception of downlink channels or signals and/or for a transmission of uplink channels or signals, and in each TCI state, the processor is provided with at least one of configuration parameters.

In a fourth aspect of the present disclosure, a base station comprises a memory, a transceiver, and a processor coupled to the memory and the transceiver. The processor is configured to perform the method of the second aspect.

BRIEF DESCRIPTION OF DRAWINGS

In order to illustrate the embodiments of the present disclosure or related art more clearly, the following figures will be described in the embodiments are briefly introduced. It is obvious that the drawings are merely some embodiments of the present disclosure, a person having ordinary skill in this field can obtain other figures according to these figures without paying the premise.

FIG. 3 is a flowchart illustrating a method of wireless communication by a user equipment (UE) according to an embodiment of the present disclosure.

FIG. 4 is a flowchart illustrating a method of wireless communication by a base station according to an embodiment of the present disclosure.

FIG. 5 illustrates a procedure of common TCI state operation in multi-TRP system according to an embodiment of the present disclosure.

DETAILED DESCRIPTION OF EMBODIMENTS

Figure 1A:
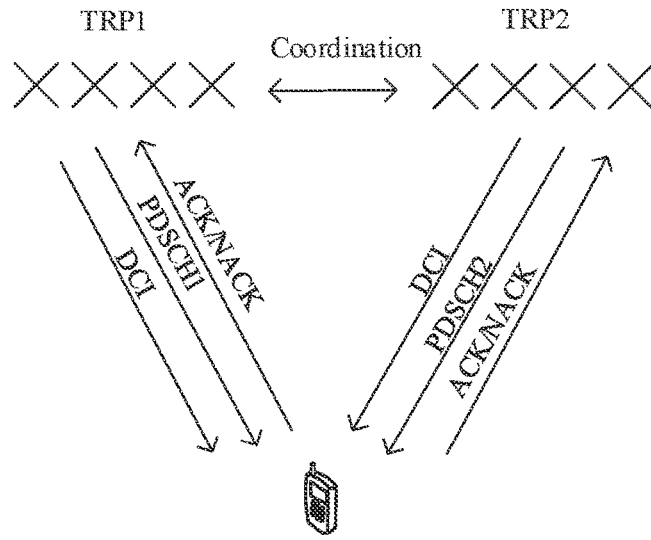
FIG. 1A is a schematic diagram illustrating that example of multi-transmission/reception point (TRP) transmission according to an embodiment of the present disclosure.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

NR/5G system supports multi-beam operation on downlink and uplink physical channels and reference signals. The use case for supporting multi-beam operation mainly is for deployment of high-frequency band system, where high-gain analog beamforming is used to combat large path loss.

NR release 15/16 supports functions of indicating beam used for PDCCH/PDSCH/CSI-RS/PUSCH/SRS/PUCCH through a framework of TCI state for downlink transmission or spatial relation for uplink transmission.

For PDCCH and PDSCH, a UE is configured with M TCI states in higher layer signaling as a candidate QCL configuration. For each CORESET for PDCCH transmission, the UE can be configured with one or more TCI states semi-statically and if more than one TCI state are configured, one MAC CE command is used to activate one of the TCI states as an active Tx beam for PDCCH transmission. For PDSCH, one MAC CE activation command can activate up to 8 TCI states and each TCI state is mapped to one codepoint in a DCI scheduling PDSCH transmission. Then for each individual PDSCH transmission, a network (NW) can dynamically indicate one of those up to 8 TCI states through the scheduling DCI.

A system can also use a single MAC CE to update/indicate TCI state(s) for PDCCH and PDSCH in multiple CCs simultaneously. Using a single MAC CE message to update TCI state(s) for PDCCH and PDSCH in multiple different CCs can reduce the overhead of control signaling. Particularly, the system can configure a list of cells for simultaneous TCI state for PDCCH and PDSCH. The system can send one MAC CE indicating one TCI state ID and one CORESET index and the UE can apply an antenna port quasi co-location provided by the indicated TCI state to the CORESET with the indicated index of all the configured cells in the configured list. For PDSCH transmission, the system can send one MAC CE message that activates up to TC state IDs for PDSCH transmission and the UE can apply the indicated TCI states Ids on the PDSCH transmission in all the configured cells in the configured list.

There are two special cases for determining the TCI state for a PDSCH transmission. If one DCI does not contain TCI field and a time offset between the PDSCH and the scheduling DCI is equal or greater than a threshold timeDurationForQCL, the TCI state applied to the CORESET used for the PDCCH transmission scheduling the PDSCH can be applied to the PDSCH transmission. If the time offset between the PDSCH and the scheduling DCI is less than the threshold timeDurationForQCL, the UE would apply a default TCI state on the PDSCH reception and the default TCI state is the TCI state or QCL assumption of CORESET wit lowest controlResourceSetId in the latest slot in which one or more CORESETs within the active BWP of serving cell are monitored by the UE.

Tx beam information for CSI-RS transmission is indicated through a TCI state configured or indicated to a CSI-RS resource. For a periodic CSI-RS resource, the TCI state is configured in RRC semi-statically. For a semi-persistent CSI-RS resource, the TCI state can be configured in RRC semi-statically or indicated in the MAC CE message that activates the transmission of semi-persistent CSI-RS. For an aperiodic CSI-RS resource, the TCI state is configured to the CSI-RS resource in the configuration of aperiodic CSI-RS trigger state in RRC. Then a base station such as a gNB can use physical layer signaling to dynamically trigger the transmission of aperiodic CSI-RS transmission and also dynamically indicate the Tx beam information.

For SRS transmission, a UE Tx beam is configured or indicated through spatial relation info. For periodic SRS transmission, the spatial relation information is configured per SRS resource in RRC semi-statically. For aperiodic SRS transmission, the spatial relation information can be configured in RRC semi-statically, which is one method, and another method is the NW can use one MAC CE to update/indicate spatial relation information for a SRS resource, which thus provide more dynamic spatial relation information updating. For semi-persistent SRS transmission, the spatial relation information can be included in the MAC CE activation command that activates the transmission of semi-persistent SRS resource. To reduce the overhead of MAC CE for indicating spatial relation information for SRS, the system can use a single MAC CE to indicate one spatial relation information for SRS resources in multiple different cells. The UE can be provided with a list of CCs and a MAC CE can be used to indicate spatial relation information for all the SRS resource with a same resource ID in all the CCs included in the configured list.

For PUCCH transmission, the UE Tx beam is configured through PUCCH spatial relation information. The UE is provided with one or more than one PUCCH spatial relation information configurations in RRCH semi-statically. Then for each PUCCH resource, the UE can be indicated with one PUCCH spatial relation information through a MAC CE activation command. To reduce the overhead of MAC CE for indicating spatial relation information for PUCCH, the system can use a single MAC CE to indicate one spatial relation information for a group of PUCCH resources.

Furthermore, when the UE is not provided with spatial relation information to an SRS resource or PUCCH resource, the UE can apply a default spatial relation information on the SRS resource or PUCCH resource. The default spatial relation information is pre-specified as follows: In a BWP where the UE is configured with any CORESET for PDCCH transmission, the default spatial relation information is the TCI state with the lowest controlResourceSetId. In a BWP where the UE is not configured with any CORESET for PDCCH transmission, the default spatial relation information is the activated TCI state with the lowest ID among the TC states activated for PDSCH in the same BWP.

NR system introduces multi-TRP based non-coherent joint transmission. Multiple TRPs are connected through a backhaul link for coordination. The backhaul link can be ideal or non-ideal. In the case of ideal backhaul, the TRPs can exchange dynamic PDSCH scheduling information with short latency and thus the different TRP can coordinates the PDSCH transmission per PDSCH transmission. While, in a non-ideal backhaul case, the information exchange between TRPs has large latency and thus the coordination between TRPs can only be semi-static or static.

In non-coherent joint transmission, different transmission/reception points (TRPs) use different physical downlink control channels (PDCCHs) to schedule physical downlink sharing channel (PDSCH) transmission independently. Each TRP can send one downlink control information (DCI) to schedule one PDSCH transmission. PDSCHs from different TRPs can be scheduled in the same slot or different slots. Two different PDSCH transmissions from different TRPs can be fully overlapped or partially overlapped in PDSCH resource allocation. To support multi-TRP based non-coherent joint transmission, a user equipment (UE) is requested to receive PDCCH from multiple TRPs and then receive PDSCH sent from multiple TRPs. For each PDSCH transmission, the UE can feedback a hybrid automatic repeat request-acknowledge (HARQ-ACK) information to a network. In multi-TRP transmission, the UE can feedback the HARQ-ACK information for each PDSCH transmission to the TRP transmitting the PDSCH. The UE can also feedback the HARQ-ACK information for a PDSCH transmission sent from any TRP to one particular TRP.

An example of multi-TRP based non-coherent joint transmission is illustrated in FIG. 1A. A UE receives a PDSCH based on non-coherent joint transmission from two TRPs. TRP1 and TRP2. As illustrated in FIG. 1A, the TRP1 sends one DCI to schedule a transmission of PDSCH 1 to the UE and the TRP2 sends one DCI to schedule a transmission of PDSCH 2 to the UE. At the UE side, the UE receives and decodes DCI from both TRPs. Based on the DCI from the TRP1, the UE receives and decodes the PDSCH 1 and based on the DCI from the TRP2, the UE receives and decodes the PDSCH 2. In the example illustrated in FIG. 1A, the UE reports HARQ-ACK for PDSCH 1 and PDSCH2 to the TRP1 and the TRP 2, respectively. The TRP1 and the TRP 2 use different control resource sets (CORESETs) and search spaces to transmit DCI scheduling PDSCH transmission to the UE. Therefore, the network can configure multiple CORESETs and search spaces. Each TRP can be associated with one or more CORESETs and also the related search spaces. With such configuration, the TRP would use the associated CORESET to transmit DCI to schedule a PDSCH transmission to the UE. The UE can be requested to decode DCI in CORESETs associated with TRP to obtain PDSCH scheduling information.

Figure 1B:
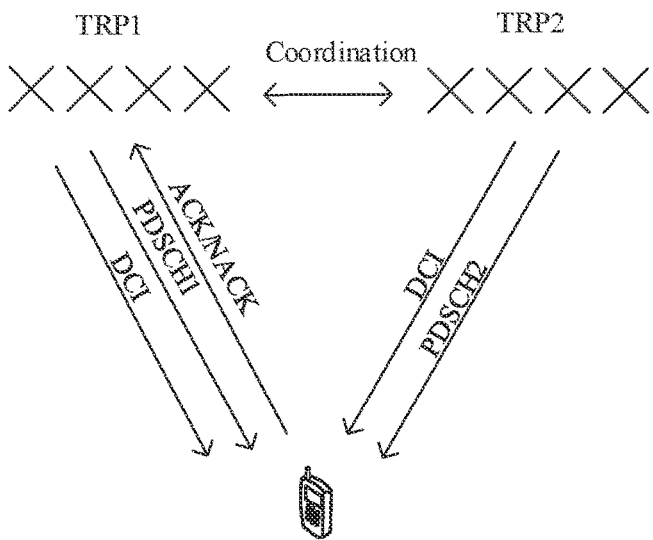
FIG. 1B is a schematic diagram illustrating that example of multi-transmission/reception point (TRP) transmission according to an embodiment of the present disclosure.

Another example of multi-TRP transmission is illustrated in FIG. 1B. A UE receives PDSCH based on non-coherent joint transmission from two TRPs: TRP1 and TRP2. As illustrated in FIG. 1B, the TRP1 sends one DCI to schedule a transmission of PDSCH 1 to the UE and the TRP2 sends one DCI to schedule the transmission of PDSCH 2 to the UE. At the UE side, the UE receives and decodes DCI from both TRPs. Based on the DCI from the TRP1, the UE receives and decodes the PDSCH 1 and based on the DCI from the TRP2, the UE receives and decodes the PDSCH 2. In the example illustrated in FIG. 1B, the UE reports HARQ-ACK for both PDSCH 1 and PDSCH2 to the TRP, which is different from the HARQ-ACK reporting in the example illustrated in FIG. 1A. The example illustrated in FIG. 1B needs ideal backhaul between the TRP 1 and the TRP 2, while the example illustrated in FIG. 1A can be deployed in the scenarios that the backhaul between the TRP 1 and the TRP 2 is ideal or non-ideal.

Figure 2:
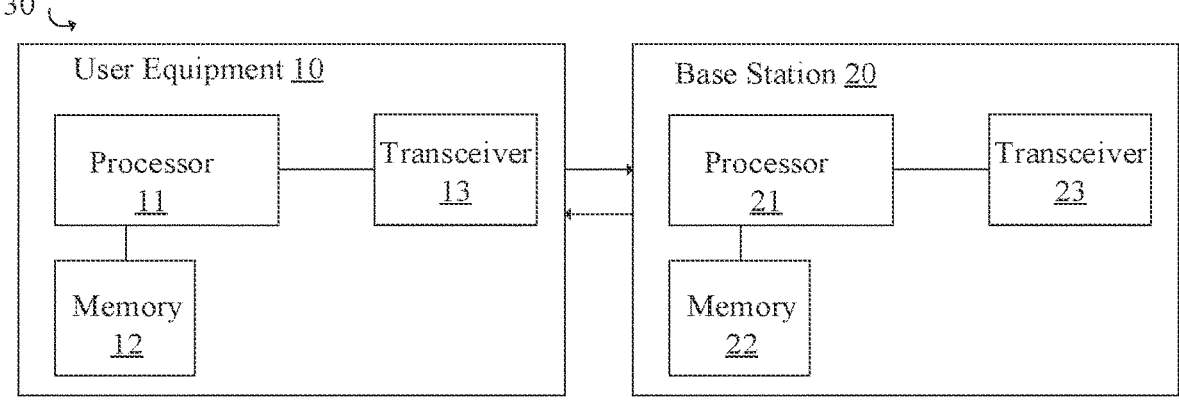
FIG. 2 is a block diagram of one or more user equipments (UEs) and a base station (e.g., gNB or eNB) of communication in a communication network system according to an embodiment of the present disclosure.

FIG. 2 illustrates that, in some embodiments, one or more user equipments (UEs) 10 and a base station (e.g., gNB or eNB) 20 for transmission adjustment in a communication network system 30 according to an embodiment of the present disclosure are provided. The communication network system 30 includes the one or more UEs 10 and the base station 20. The one or more UEs 10 may include a memory 12, a transceiver 13, and a processor 11 coupled to the memory 12 and the transceiver 13. The base station 20 may include a memory 22, a transceiver 23, and a processor 21 coupled to the memory 22 and the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include base-band circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the processor 11 is configured, by the base station 20, with a configuration of one or more transmission configuration indicator (TCI) states, wherein each TCI state comprises one or more reference signals for a reception of downlink channels or signals and/or for a transmission of uplink channels or signals, and in each TCI state, the processor 11 is provided with at least one of configuration parameters. This can solve issues in the prior art, reach a good balance between a resource overhead and a good positioning performance in a system deployment, improve a system capacity, improve a beam switch latency, provide a good communication performance, and/or provide high reliability.

In some embodiments, the processor 21 is configured to configure, to the UE 10, a configuration of one or more transmission configuration indicator (TCI) states, wherein each TCI state comprises one or more reference signals for a transmission of downlink channels or signals and/or for a reception of uplink channels or signals, and in each TCI state, the processor 21 is configured to provide, to the UE 10, at least one of configuration parameters. This can solve issues in the prior art, reach a good balance between a resource overhead and a good positioning performance in a system deployment, improve a system capacity, improve a beam switch latency, provide a good communication performance, and/or provide high reliability.

According to some embodiments, the issues in the prior art can be solved, a good balance between a resource overhead and a good positioning performance in a system deployment can be achieved, a system capacity can be improved, a beam switch latency can be improved, a good communication performance, and/or provide high reliability can be provided.

FIG. 3 illustrates a method 200 of wireless communication by a user equipment (UE) 10 according to an embodiment of the present disclosure. In some embodiments, the method 200 includes: a block 202, being configured, by a base station, with a configuration of one or more transmission configuration indicator (TCI) states, wherein each TCI state comprises one or more reference signals for a reception of downlink channels or signals and/or for a transmission of uplink channels or signals, and a block 204, in each TCI state, being provided with at least one of configuration parameters. This can solve issues in the prior art, reach a good balance between a resource overhead and a good positioning performance in a system deployment, improve a system capacity, improve a beam switch latency, provide a good communication performance, and/or provide high reliability.

FIG. 4 illustrates a method 300 of wireless communication by a base station 20 according to an embodiment of the present disclosure. In some embodiments, the method 300 includes: a block 302, configuring, to a user equipment (UE), a configuration of one or more transmission configuration indicator (TCI) states, wherein each TCI state comprises one or more reference signals for a transmission of downlink channels or signals and/or for a reception of uplink channels or signals, and a block 304, in each TCI state, providing, to the UE, at least one of configuration parameters. This can solve issues in the prior art, reach a good balance between a resource overhead and a good positioning performance in a system deployment, improve a system capacity, improve a beam switch latency, provide a good communication performance, and/or provide high reliability.

In some embodiments, the one or more reference signals comprise a configuration of a quasi co-location (QCL) for the reception of the downlink channels or signals. In some embodiments, the one or more reference signals comprise a configuration of a spatial filter for the transmission of the uplink channels or signals. In some embodiments, each TCI state is associated with a pathloss reference signal for the transmission of the uplink channels or signals. In some embodiments, the at least one of configuration parameters comprises: a reference signal providing a QCL-Type D for a QCL relationship between one or more downlink reference signals and a demodulation reference signal (DMRS) port of a physical downlink shared channel (PDSCH), a DMRS port of a physical downlink control channel (PDCCH), or a channel state information reference signal (CSI-RS) port of a CSI-RS resource; a reference signal providing information for determining a spatial filter for a transmission of a physical uplink shared channel (PUSCH), a physical uplink control channel (PUCCH), or a sounding reference signal (SRS) resource; a reference signal providing the QCL-Type D for the PDSCH, the PDCCH or the CSI-RS resource and the spatial filter for the PUSCH, the PUCCH, or the SRS resource; a reference signal providing a pathloss reference signal for the PUSCH, the PUCCH, or the SRS resource; or a reference signal providing the QCL-Type D for the PDSCH, the PDCCH, or the CSI-RS resource, the spatial filter, and the pathloss reference signal for the PUSCH, the PUCCH, or the SRS resource.

In some embodiments, the reference signal providing a QCL assumption comprises a synchronization signal/physical broadcast channel (SS/PBCH) block, the CSI-RS resource, or the SRS resource; the reference signal providing the information for determining the spatial filter for the PUSCH, the PUCCH, or the SRS resource comprises the SS/PBCH block, the CSI-RS resource, or the SRS resource; or the reference signal providing the pathloss reference signal for the PUSCH, the PUCCH, or the SRS resource comprises the SS/PBCH block or the CSI-RS resource. In some embodiments, the TCI state for downlink and/or uplink is configured through a radio resource control (RRC) parameter. In some embodiments, the method further comprises being configured, by the base station, with a configuration of multi-transmission/reception point (TRP) transmission and/or a common TCI state operation mode in the multi-TRP transmission. In some embodiments, the one or more TCI states comprise a first TCI state for TRP associated with CORESETPoolIndex with a value of 0 and/or a second TCI state for TRP associated with the CORESETPoolIndex with a value of 1. In some embodiments, the method, further comprises determining, by the UE, the TCI state for each channel or reference signal according to an associated TRP.

In some embodiments, when the UE receives a PDCCH, a PDSCH, and/or a CSI-RS resource that is associated with the CORESETPoolIndex with a value of 0, the UE applies a QCL configuration included in the first TCI state. In some embodiments, when the UE transmits a PUSCH, a PUCCH, and/or an SRS resource that is associated with the CORESETPoolIndex with the value of 0, the UE applies a spatial filter and a pathloss reference signal included in the first TCI state. In some embodiments, when the UE receives a PDCCH, a PDSCH, and/or a CSI-RS resource that is associated with the CORESETPoolIndex with a value of 1, the UE applies a QCL configuration included in the second TCI state. In some embodiments, when the UE transmits a PUSCH, a PUCCH, and/or an SRS resource that is associated with the CORESETPoolIndex with the value of 1, the UE applies a spatial filter and a pathloss reference signal included in the second TCI state. In some embodiments, the CORESETPoolIndex is used to differentiate different TRPs.

In some embodiments, when the UE is indicated with the first TCI state, the UE is requested to apply a QCL information included in the first TCI state on the reception of one or more of the following channels or signals: a PDCCH transmission in a control resource set (CORESET) configured or associated with the CORESETPoolIndex with the value of 0; a PDSCH transmission scheduled by a PDCCH transmitted in the CORESET configured or associated with the CORESETPoolIndex with the value of 0; an access point (AP) CSI-RS resource triggered by the PDCCH transmitted in the CORESET configured or associated with the CORESETPoolIndex with the value of 0; a PDSCH transmission of a semi-persistent scheduling (SPS) triggered by the PDCCH transmitted in the CORESET configured or associated with the CORESETPoolIndex with the value of 0: an SPS PDSCH transmission configured or associated with the CORESETPoolIndex with the value of 0; or a periodic or semi-persistent CSI-RS resource associated with the CORESETPoolIndex with the value of 0.

In some embodiments, the UE is requested to apply information of a spatial filter and/or a pathloss reference signal included in the first TCI state on the transmission of one or more of the following channels or signals: a PUSCH transmission scheduled by a PDCCH transmitted in a CORESET configured or associated with the CORESETPoolIndex with the value of 0; a PUSCH transmission of a configured grant that is activated by a DCI detected in a PDCCH transmitted in the CORESET configured or associated with the CORESETPoolIndex with the value of 0; a PUSCH transmission of a configured grant that is associated with the CORESETPoolIndex with the value of 0; a PUCCH transmission associated with the CORESETPoolIndex with the value of 0; a PUCCH transmission that is triggered by a PDCCH transmitted in the CORESET configured or associated with the CORESETPoolIndex with the value of 0; an SRS transmission that is associated with the CORESETPoolIndex with the value of 0; or an AP SRS transmission that is triggered by a PDCCH transmitted in the CORESET configured or associated with the CORESETPoolIndex with the value of 0.

In some embodiments, when the UE is indicated with the second TCI state, the UE is requested to apply a QCL information included in the second TCI state on the reception of one or more of the following channels or signals: a PDCCH transmission in a control resource set (CORESET) configured or associated with the CORESETPoolIndex with the value of 1; a PDSCH transmission scheduled by a PDCCH transmitted in the CORESET configured or associated with the CORESETPoolIndex with the value of 1; an access point (AP) CSI-RS resource triggered by the PDCCH transmitted in the CORESET configured or associated with the CORESETPoolIndex with the value of 1; a PDSCH transmission of a semi-persistent scheduling (SPS) triggered by the PDCCH transmitted in the CORESET configured or associated with the CORESETPoolIndex with the value of 1; an SPS PDSCH transmission configured or associated with the CORESETPoolIndex with the value of 1; or a periodic or semi-persistent CSI-RS resource associated with the CORESETPoolIndex with the value of 1.

In some embodiments, the UE is requested to apply information of a spatial filter and/or a pathloss reference signal included in the second TCI state on the transmission of one or more of the following channels or signals: a PUSCH transmission scheduled by a PDCCH transmitted in a CORESET configured or associated with the CORESET-PoolIndex with the value of 1; a PUSCH transmission of a configured grant that is activated by a DCI detected in a PDCCH transmitted in the CORESET configured or associated with the CORESETPoolIndex with the value of 1; a PUSCH transmission of a configured grant that is associated with the CORESETPoolIndex with the value of 1; a PUCCH transmission associated with the CORESETPoolIndex with the value of 1; a PUCCH transmission that is triggered by a PDCCH transmitted in the CORESET configured or associated with the CORESETPoolIndex with the value of 1; an SRS transmission that is associated with the CORESET-PoolIndex with the value of 1; or an AP SRS transmission that is triggered by a PDCCH transmitted in the CORESET configured or associated with the CORESETPoolIndex with the value of 1. In some embodiments, the one or more TCI states are configured through downlink control information (DCI) or a media access control (MAC) control element (CE). In some embodiments, the DCI comprises a DCI format 1_1, a DCI format 1_2, a DCI format X1, or a DCI format Y1. In some embodiments, the DCI format 1_1 or the DCI format 12 carrying a DCI field transmission configuration indication, a value of the DCI field transmission configuration indication indicates one TCI state for the UE and the UE applies an indicated TCI state on a PDCCH, a PDSCH, a PUSCH, a PUCCH, a CSI-RS resource, and/or an SRS resource that is associated with the same value of CORESETPoolIndex as the PDCCH carrying the DCI that indicates the TCI state.

In some embodiments, the value of the DCI field transmission configuration indication corresponds to one TCI state that is configured in a higher layer parameter; the value of the DCI field transmission configuration indication corresponds to one of the TC states that are activated by a MAC CE command; or one of the values of the DCI field transmission configuration indication indicates that no TC state is indicated by the DCI format 1_1 or the DCI format 1_2. In some embodiments, when one of the values of the DCI field transmission configuration indication indicates that no TCI state is indicated by the DCI format 1_1 or the DCI format 1_2, the UE continues to use the TCI state indicated by one previous DCI format 1_1 or DCI format 1_2. In some embodiments, the DCI format X1 is used to indicate the TCI state for a TRP to the UE, and at least on of following information is transmitted by the DCI format X1 with a cyclic redundancy check (CRC) scrambled by a cell radio network temporary identifier (C-RNTI). In some embodiments, the at least one of following information transmitted by the DCI format X1 with the CRC scrambled by the C-RNTI comprises: an identifier for DCI formats; a carrier indicator; a bandwidth part indicator; a PUCCH resource indicator; a transmission power control (TPC) command for a scheduled PUCCH; a PDCCH-to-hybrid automatic repeat request (HARQ) feedback timing indicator; a TCI state ID; or an indicator of CORESETPoolIndex value.

In some embodiments, the at least one of following information transmitted by the DCI format X1 with the CRC scrambled by the C-RNTI comprises: an identifier for DCI formats; a carrier indicator; a bandwidth part indicator; a PUCCH resource indicator; a TPC command for a scheduled PUCCH; a PDCCH-to-HARQ feedback timing indicator; an ID of a first TCI state; or an ID of a second TCI state. In some embodiments, when the UE receives the DCI format Y1 at a slot, the UE derives the TCI state according to a value indicated in a block number of the DCI format Y1 that the UE is configured with, and/or the UE is requested to apply the indicated TCI state for receiving a PDCCH, a PDSCH, or a CSI-RS resource and/or transmits a PUSCH, a PUCCH, or an SRS resource starting from a first slot after symbols from a last symbol of a PDCCH reception carrying the DCI format Y1. In some embodiments, the MAC CE comprises at least one of following fields: a serving cell ID; a TCI state ID; or a CORESET pool ID. In some embodiments, the MAC CE comprises at least one of following fields: a serving cell ID, a first TCI state ID; or a second TCI state ID.

In some examples, a UE can be configured with one or more higher layer parameters for TCI state and in each TCI state, the UE can be provided with one or more of the following parameters: 1. One reference signal providing 'QCL-TypeD' quasi co-location type for quasi co-location relationship between one or two downlink reference signals and the DM-RS ports of the PDSCH, the DM-RS port of PDCCH or the CSI-RS port(s) of a CSI-RS resource. 2. One reference signal providing information for determining spatial filter for the transmission of PUSCH, PUCCH or the SRS resource. 3. One reference signal providing both 'QCL-TypeD' for PDSCH, PDCCH or CSI-RS resource and spatial filter for PUSCH, PUCCH or the SRS resource. 4. One reference signal providing pathloss reference signal for PUSCH, PUCCH or the SRS resource. 5. One reference signal providing both 'QCL-TypeD' for PDSCH, PDCCH, or CSI-RS resource and spatial filter and path loss reference signal for PUSCH, PUCCH, or the SRS resource.

In one exemplary method, an RS providing QCL assumption can be a SS/PBCH block, a CSI-RS resource, or an SRS resource. An RS providing information for determining spatial filter for PUSCH, PUCCH, or SRS resource can be an SS/PBCH block, a CSI-RS resource, or an SRS resource. An RS providing information of pathloss RS for PUSCH, PUCCH, or SRS resource can be an SS/PBCH block or a CSI-RS resource. In one example, a TCI state for DL and UL can be configured through the following RRC parameter:

```
TCI-State ::=              SEQUENCE {
    tci-StateId                TCI-StateId,
    qcl-spatial-Type1              QCL-Spatial-Info,
    qcl-spatial-Type2              QCL-Spatial-Info
    ...
}
QCL-Spatial-Info ::=              SEQUENCE {
    cell                          ServCellIndex
OPTIONAL,    -- Need R
    bwp-Id                        BWP-Id
OPTIONAL, -- Cond CSI-RS-Indicated
    referenceSignal               CHOICE {
```

-continued

```
    csi-rs                      NZP-CSI-RS-ResourceId,
    ssb                         SSB-Index
    srs                         SRS-ResourceId
    },
    qcl-Type                    ENUMERATED {typeA, typeB, typeC,
typeD},
    spaitialInfo                ENUMERATED {enabled},
    pathLossRs                  ENUMERATED {enabled}
    ...
}
```

In another example, a TCI state for DL and UL transmission can be configured through the following RRC parameter:

```
TCI-State ::=                   SEQUENCE {
    tci-StateId                     TCI-StateId,
    qcl-Type1                       QCL-Info,
    qcl-Type2                       QCL-Info
OPTIONAL,    -- Need R
    spatialSettingInfo          Spatial-Info
    ...
    }
    QCL-Info ::=                    SEQUENCE {
    cell                                ServCellIndex
OPTIONAL,    -- Need R
    bwp-Id                              BWP-Id
OPTIONAL, -- Cond CSI-RS-Indicated
        referenceSignal             CHOICE {
            csi-rs                          NZP-CSI-RS-ResourceId,
            ssb                             SSB-Index
        },
        qcl-Type                        ENUMERATED {typeA, typeB, typeC,
typeD},
        ...
    }
    Spatial-Info ::=      SEQUENCE {
    cell                                ServCellIndex
OPTIONAL,    -- Need R
    bwp-Id                              BWP-Id
OPTIONAL, -- Cond CSI-RS-Indicated
        referenceSignal                 CHOICE {
            ssb-Index                       SSB-Index,
            csi-RS-Index                    NZP-CSI-RS-ResourceId,
            srs                             SRS-ResourceId
        },
        pathlossReferenceRS             PathlossReferenceRS-Config
    }
    PathlossReferenceRS-Config ::=      CHOICE {
        ssb-Index                           SSB-Index,
        csi-RS-Index                        NZP-CSI-RS-ResourceId
}
```

In one embodiment, in a multi-DCI based multi-TRP system, the UE is not provided CORESETPoolIndex or is provided CORESETPoolIndex with a value of 0 for first CORESETs on active DL BWPs of serving cells, and the UE is provided CORESETPoolIndex with a value of 1 for second CORESETs on active DL BWPs of the serving cells. Here the CORESETPoolIndex is used to differentiate two different TRPs. When the UE is configured with a common TCI state operation mode, the system can indicate a first TCI state for example through DCI or MAC CE for the TRP associated with CORESETPoolIndex with a value of 0 and the system can indicate a second TCI state for example through DCI or MAC CE for the TRP associated with CORESETPoolIndex with a value of 1.

When the UE is indicated with the first TCI state, the UE can be requested to apply the QCL information included in the first TCI state on the reception of one or more of the following channels or signals: 1. The PDCCH transmission in the CORESET configured or associated with CORESET- PoolIndex with a value of 0.2. The PDSCH transmission scheduled by PDCCH transmitted in the CORESET configured or associated with CORESETPoolIndex with a value of 0.3. AP CSI-RS resource triggered by PDCCH transmitted in the CORESET configured or associated with CORESET-PoolIndex with a value of 0.4. The PDSCH transmission of SPS triggered by PDCCH transmitted in the CORESET configured or associated with CORESETPoolIndex with a value of 0.5. The SPS PDSCH transmission configured or associated with CORESETPoolIndex with a value of 0.6. Periodic or semi-persistent CSI-RS resource associated with CORESETPoolIndex with a value of 0.

In some examples, the UE can be requested to apply the information of spatial filter and/or pathloss RS included in the first TCI state on the transmission of one or more of the following channels or signals: 1. The PUSCH transmission scheduled by PDCCH transmitted in the CORESET configured or associated with CORESETPoolIndex with a value of 0.2. The PUSCH transmission of configured grant that is activated by a DCI detected in PDCCH transmitted in the CORESET configured or associated with CORESETPoolIndex with a value of 0.3. The PUSCH transmission of configured grant that is associated with CORESETPoolIndex with a value of 0.4. PUCCH transmission associated with CORESETPoolIndex with a value of 0.5. A PUCCH transmission that is triggered by PDCCH transmitted in the CORESET configured or associated with CORESETPoolIndex with a value of 0.6. SRS transmission that is associated with CORESETPoolIndex with a value of 0.7. AP SRS transmission that is triggered by PDCCH transmitted in the CORESET configured or associated with CORESETPoolIndex with a value of 0.

In some examples, when the UE is indicated with the second TCI state, the UE can be requested to apply the QCL information included in the second TCI state on the reception of one or more of the following channels or signals: 1. The PDCCH transmission in the CORESET configured or associated with CORESETPoolIndex with a value of 1.2. The PDSCH transmission scheduled by PDCCH transmitted in the CORESET configured or associated with CORESETPoolIndex with a value of 1.3. AP CSI-RS resource triggered by PDCCH transmitted in the CORESET configured or associated with CORESETPoolIndex with a value of 1.4. The PDSCH transmission of SPS triggered by PDCCH transmitted in the CORESET configured or associated with CORESETPoolIndex with a value of 1.5. The SPS PDSCH transmission configured or associated with CORESET-PoolIndex with a value of 1.6. Periodic or semi-persistent CSI-RS resource associated with CORESETPoolIndex with a value of 1.

In some examples, the UE can be requested to apply the information of spatial filter and/or pathloss RS included in the second TCI state on the transmission of one or more of the following channels or signals: 1. The PUSCH transmission scheduled by PDCCH transmitted in the CORESET configured or associated with CORESETPoolIndex with a value of 1.2. The PUSCH transmission of configured grant that is activated by a DCI detected in PDCCH transmitted in the CORESET configured or associated with CORESET-PoolIndex with a value of 1.3. The PUSCH transmission of configured grant that is associated with CORESETPoolIndex with a value of 1.4. PUCCH transmission associated with CORESETPoolIndex with a value of 1.5. A PUCCH transmission that is triggered by PDCCH transmitted in the CORESET configured or associated with CORESETPoolIndex with a value of 1.6. SRS transmission that is associated with CORESETPoolIndex with a value of 1.7. AP SRS transmission that is triggered by PDCCH transmitted in the CORESET configured or associated with CORESETPoolIndex with a value of 1.

FIG. 5 illustrates a procedure of common TCI state operation in multi-TRP system according to an embodiment of the present disclosure. FIG. 5 illustrates that, in some embodiments, the procedure of common TCI state operation in multi-TRP system includes: a block 510, UE receives configuration of one or more TCI states and each TCI state can contain the configuration of QCL for reception of DL channels/signal and configuration of spatial filter and/or pathloss RS for transmission of UL channel/signal, a block 520, UE receives the configuration of multi-TRP transmission, and the UE is configured with a common TCI state operation mode in multi-TRP transmission, a block 530, gNB indicates a first TCI state for TRP associated with CORESETPoolIndex=0 and the gNB indicates a second TCI state for TRP associated with CORESETPoolIndex=1, a block 540, UE determines the TCI state for each channel or reference signal according to the associated TRP, a block 550, when receiving PDCCH, PDSCH and CSI-RS that are associated with CORESETPoolIndex=0, the UE can apply the QCL configuration included in the first TCI state, a block 560, when transmitting PUSCH, PUCCH and SRS that are associated with CORESETPoolIndex=0, the UE can apply the spatial filter and pathloss RS included in the first TCI state, a block 570, when receiving PDCCH, PDSCH and CSI-RS that are associated with CORESETPoolIndex=1, the UE can apply the QCL configuration included in the Second TCI state, and a block 580, when transmitting PUSCH, PUCCH and SRS that are associated with CORE- SETPoolIndex=1, the UE can apply the spatial filter and pathloss RS included in the second TCI state.

In one exemplary method, a UE can be configured with M TCI states in higher layer configuration and the UE can be indicated with a first TCI state among those M TCI states for the TRP associated with CORESETPoolIndex with a value of 0 and the UE can be indicated with a second TCI state among those M TCI states for the TRP associated with CORESETPoolIndex with a value of 1. In this method, a joint pool of TCI states is shared for both TRPs. In one exemplary method, a UE can be configured with a first set of M1 TCI states in higher layer configuration and the UE can be indicated with a first TCI state among those M1 TCI states for the TRP associated with CORESETPoolIndex with a value of 0. The UE can be configured with a second set of M2 TCI states in higher layer configuration and the UE can be indicated with a second TCI state among those M2 TCI states for the TRP associated with CORESETPoolIndex with a value of 1.

In one embodiment, the gNB can use DCI to indicate one TCI state for DL channels, UL channel and reference signal associated with a TRP. The gNB can use a DCI to indicate to a first TCI state for TRP associated with CORESET-PoolIndex=0. The gNB can use a DCI to indicate to a first TCI state for TRP associated with CORESETPoolIndex=1. In a first exemplary method, DCI format 1_1 and DCI format 1_2 can be used to indicate a first TCI state or a second TCI state. When a UE receiving a DCI format 1_1 or DCI format 1_2 carrying a DCI field Transmission configuration indication, the value of DCI field Transmission configuration indication can indicate one TCI state for the UE and the UE shall apply the indicated TCI state on the PDCCH, PDSCH, PUSCH, PUCCH, CSI-RS and SRS that are associated with the same value of CORESETPoolIndex as the PDCCH carrying the DCI that indicates the TCI state: 1. The value of DCI field Transmission configuration indication can correspond to one TCI state that is configured in higher layer parameter. 2. The value of DCI field Transmission configuration indication can correspond to one of the TCI states that are activated by a MAC CE command. 3. One of the values of DCI field Transmission configuration indication for example, 0, can indicate that no TCI state is indicated by the DCI format 1_1 or DCI format 1_2. In this case, the UE would continue to use the TCI state indicated by one previous DCI format 1_1 or DCI format 1_2.

In a second exemplary method, a DCI format X1 can be used by the system to indicate a TCI state for a TRP to the UE. The DCI format X1 is used for indicating TCI state to a UE. In one example, one or more of the following information is transmitted by means of DCI format X1 with CRC scrambled by C-RNTI: 1. Identifier for DCI formats. 2. Carrier indicator. 3. Bandwidth part indicator. 4. PUCCH resource indicator. 5. TPC command for scheduled PUCCH. 6. PDCCH-to-HARQ_feedback timing indicator. 7. TCI state ID. 8. Indicator of CORESETPoolIndex value.

In one example, when a UE receives a DCI format X1 carrying a TCI state, the UE shall apply the indicated TCI state on the PDCCH, PDSCH, PUSCH, PUCCH, CSI-RS and SRS that are associated with the same value of CORE-SETPoolIndex as the PDCCH carrying the DCI that indicates the TCI state. In one example, when a UE receives a DCI format X1 carrying a TCI state, the UE shall apply the indicated TCI state on the PDCCH, PDSCH, PUSCH, PUCCH, CSI-RS and SRS that are associated with the value of CORESETPoolIndex that is indicated in the same DCI format X1. In one example, one or more of the following information is transmitted by means of DCI format X1 with CRC scrambled by C-RNTI: 1. Identifier for DCI formats. 2. Carrier indicator. 3. Bandwidth part indicator. 4. PUCCH resource indicator. 5. TPC command for scheduled PUCCH. 6. PDCCH-to-HARQ_feedback timing indicator. 7. ID of a first TCI state. 8. ID of a second TCI state.

In some examples, the DL channels, CSI-RS resources, UL channels and SRS resource can be associated with a value of a higher layer parameter. The DCI field "Id of a first TCI state" can indicate one TCI state that the UE is requested to apply on receiving PDCCH, PDSCH or CSI-RS resource that are associated with a first value of the higher layer parameter and transmitting PUSCH, PUCCH or SRS resource that are associated with a CORESETPoolIndex=0. The DCI field "Id of a second TCI state" can indicate one TCI state that the UE is requested to apply on receiving PDCCH, PDSCH or CSI-RS resource that are associated with a second value of the higher layer parameter and transmitting PUSCH, PUCCH or SRS resource that are associated with CORESETPoolIndex=1.

In a third exemplary method, a DCI format Y1 is used to indicate TCI state for one or more UEs. The DCI format Y1 can be transmitted with CRC scrambled with TCI-State-RNTI. The following information can be transmitted by means of DCI format Y1 with CRC scrambled with TCI-State-RNTI: block number 1, block number 2, . . . , block number N, where the starting position and length of a block can be configured through higher layer parameters for the UE configured with the block. In one example, a block number i can be used to indicate one TCI state for a UE: 1. The starting position of block number i can be configured through a higher layer parameter for the UE configured with this block. 2. The length (i.e., number of bits) of block number i can be configured through a higher layer parameter for the UE configured with this block. 3. Number of TCI states that are included in the block number i. For example, block number i can only include one TC state. For example, block number i can include two TCI states.

In one example, the bits in block number I can indicate the following information for a UE: 1. A TCI state ID and an indicator of CORESETPoolIndex value. The UE can be requested to assume the indicated TCI state shall be applied to the transmission associated with the indicated CORESETPoolIndex value. 2. The length (i.e., number of bits) of block number i can be determined as $\lceil \log_2 M \rceil + 1$ where M is the number TCI states configured to the UE configured with this block. In one example, the bits in block number i can indicate two TCI state Id. Some bits in the block number i are used to indicate a first TCI state for CORESETPoolIndex=0 and some bits in the block number i are used to indicate a second TCI state for CORESETPoolIndex=1. In this example, the length (i.e., number of bits) of block number i can be determined as $2 \times \lceil \log_2 M \rceil$ where M is the number TCI states configured to the UE configured with this block. In one example, one special value of block number can be defined as that no TCI state is indicated for the corresponding UE. For example, when the value of block number i is all 0s, the UE can assume no TCI state is indicated by the block number i. When a UE receives a DCI format Y1 at slot n, the UE can derive a TCI state according to the value indicated in block number i that the UE is configured with. the UE can be requested to apply the indicated TCI state for receiving PDCCH, PDSCH or CSI-RS resource and transmitting PUSCH, PUCCH or SRS resource starting from the first slot after N1 symbols from the last symbol of a PDCCH reception carrying the DCI format Y1.

In one embodiment, the gNB can use MAC CE to indicate one TCI state for DL channels, UL channel and reference signal associated with a TRP. The gNB can use a DCI to indicate to a first TCI state for TRP associated with CORESETPoolIndex=0. The gNB can use a DCI to indicate to a first TCI state for TRP associated with CORESETPoolIndex=1. In one exemplary method, a MAC CE that indicates TCI state for common TCI state operation for multi-TRP system can include the following fields: 1. Serving Cell ID: This field indicates the identity of the Serving Cell for which the MAC CE applies. The length of the field is 5 bits. 2. TCI state ID: This field indicates the TCI state identified by TCI-StateId as configured in higher layer parameter configuration. 3. CORESET Pool ID: This field indicates that the indicated TCI state is specific for the transmissions associated with the CORESETPoolIndex indicated by this field. In one exemplary method, a MAC CE that indicates TCI state for common TCI state operation for multi-TRP system can include the following fields: 1. Serving Cell ID: This field indicates the identity of the Serving Cell for which the MAC CE applies. The length of the field is 5 bits. 2. TCI state ID #1: This field indicates the TCI state identified by TCI-StateId as configured in higher layer parameter configuration and the TCI state indicated by this field is specific for the transmissions associated with the CORESETPoolIndex=0.3. TCI state ID #2: This field indicates the TCI state identified by TCI-StateId as configured in higher layer parameter configuration and the TCI state indicated by this field is specific for the transmissions associated with the CORESETPoolIndex=1.

In summary, in some embodiments of this disclosure, some exemplary methods for single TCI state based multi-beam operation are presented: 1. The UE can be provided with one or more TCI states and each TCI state can include one or more RS providing QCL information for reception of downlink channels or signals and one reference signal providing the information for determining spatial filter for transmission of uplink channels and signals. Each TCI state can also be associated with a path loss reference signal. 2. In multi-DCI based multi-TRP systems, the UE can be configured with a 'common TCI state' operation mode and the system can indicate a first TC state for all the PDCCH, PDSCH, CSI-RS, PUSCH, PUCCH and/or SRS that are associated with CORESETPoolIndex=0 and the system can indicate a second TCI state for all the PDCCH, PDSCH, CSI-RS, PUSCH, PUCCH and/or SRS that are associated with CORESETPoolIndex=1.

The following 3GPP standards are incorporated in some embodiments of this disclosure by reference in their entireties: 3GPP TS 38.211 V16.0.0: "NR, Physical channels and modulation", 3GPP TS 38.212 V16.0.0: "NR, Multiplexing and channel coding", 3GPP TS 38.213 V16.0.0: "NR, Physical layer procedures for control"; 3GPP TS 38.214 V16.0.0: "NR, Physical layer procedures for data", 3GPP TS 38.215 V16.0.0: "NR, Physical layer measurements", 3GPP TS 38.321 V16.0.0: "NR, Medium Access Control (MAC) protocol specification", 3GPP TS 38.331 V16.0.0: "NR, Radio Resource Control (RRC) protocol specification".

The following table includes some abbreviations, which may be used in some embodiments of the present disclosure:

| 3GPP | 3$^{rd}$ Generation Partnership Project |
|------|----------------------------------------|
| 5G   | 5$^{th}$ Generation                    |
| NR   | New Radio                              |
| CC   | Component Carrier                      |
| gNB  | Next generation NodeB                  |

-continued

| DL | Downlink |
|---|---|
| UL | Uplink |
| PUSCH | Physical Uplink Shared Channel |
| PUCCH | Physical Uplink Control Channel |
| PDSCH | Physical Downlink Shared Channel |
| PDCCH | Physical Downlink Control Channel |
| SRS | Sounding Reference Signal |
| CSI | Channel state information |
| CSI-RS | Channel state information reference signal |
| CSI-IM | Channel state information-interference measurement |
| NZP CSI-RS | Non-zero-power Channel state information reference signal |
| RS | Reference Signal |
| CORESET | Control Resource Set |
| DCI | Downlink control information |
| TRP | Transmission/reception point |
| ACK | Acknowledge |
| NACK | Non-Acknowledge |
| UCI | Uplink control information |
| RRC | Radio Resource Control |
| HARQ | Hybrid Automatic Repeat Request |
| MAC | Media Access Control |
| CRC | Cyclic Redundancy Check |
| RNTI | Radio Network Temporary Identity |
| RB | Resource Block |
| PRB | Physical Resource Block |
| NW | Network |
| RSRP | Reference signal received power |
| L1-RSRP | Layer 1 Reference signal received power |
| TCI | Transmission Configuration Indicator |
| Tx | Transmission |
| Rx | Receive |
| QCL | Quasi co-location |
| SSB | SS/PBCH Block |
| PBCH | Physical broadcast channel |
| SSS | Secondary synchronization signal |
| CRI | CSI-RS resource indicator |
| SSBRI | SS/PBCH block resource indicator |
| SINR | Signal to Interference Noise Ratio |
| L1-SINR | Layer 1 Signal to Interference Noise Ratio |
| DMRS | Demodulation Reference Signal |

Commercial interests for some embodiments are as follows. 1. Solving issues in the prior art. 2. Reaching a good balance between a resource overhead and a good positioning performance in a system deployment. 3. Improving a system capacity. 4. Improving a beam switch latency. 5. Providing a good communication performance. 6. Providing high reliability. 7. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. The deployment scenarios include, but not limited to, indoor hotspot, dense urban, urban micro, urban macro, rural, factor hall, and indoor D2D scenarios. Some embodiments of the present disclosure are a combination of "techniques/processes" that can be adopted in 3GPP specification to create an end product. Some embodiments of the present disclosure could be adopted in 5G NR licensed and non-licensed or shared spectrum communications. Some embodiments of the present disclosure propose technical mechanisms. The present example embodiment is applicable to NR in unlicensed spectrum (NR-U). The present disclosure can be applied to other mobile networks, in particular to mobile network of any further generation cellular network technology (6G, etc.).

Figure 6:
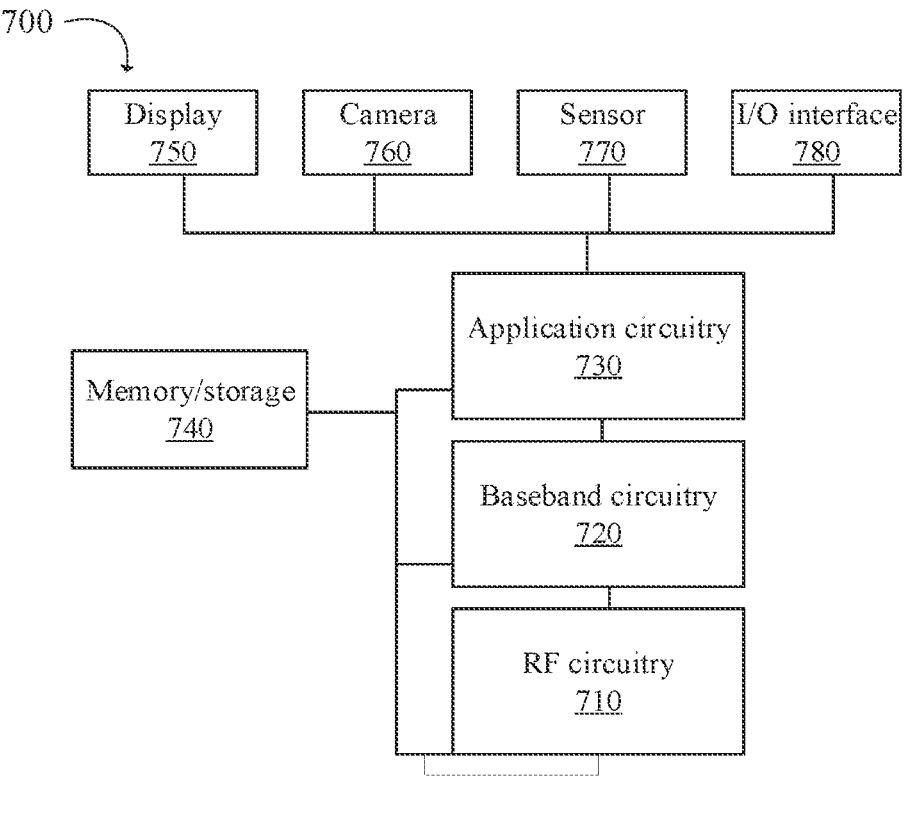
FIG. 6 is a block diagram of a system for wireless communication according to an embodiment of the present disclosure.

FIG. 6 is a block diagram of an example system 700 for wireless communication according to an embodiment of the present disclosure. Embodiments described herein may be implemented into the system using any suitably configured hardware and/or software. FIG. 6 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, an AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A wireless communication method by a user equipment (UE), comprising:

being configured, by a base station, with a configuration of one or more transmission configuration indicator (TCI) states, wherein each TCI state comprises one or more reference signals for a reception of downlink channels or signals and/or for a transmission of uplink channels or signals; and in each TCI state, being provided with at least one of configuration parameters;

wherein the method further comprises: being configured, by the base station, with a configuration of multi-transmission/reception point (TRP) transmission and/or a common TCI state operation mode in the multi-TRP transmission, and wherein the one or more TCI states comprise a first TCI state for TRP associated with CORESETPoolIndex with a value of 0 and/or a second TCI state for TRP associated with the CORESETPoolIndex with a value of 1;

wherein when the UE is indicated with the first TCI state, the UE is requested to apply a quasi co-location (QCL) information included in the first TCI state on the reception of one or more of the following channels or signals:

a physical downlink control channel (PDCCH) transmission in a control resource set (CORESET) configured or associated with the CORESETPoolIndex with the value of 0;

a physical downlink shared channel (PDSCH) transmission scheduled by a PDCCH transmitted in the CORESET configured or associated with the CORE-SETPoolIndex with the value of 0;

an access point (AP) channel state information reference signal (CSI-RS) resource triggered by the PDCCH transmitted in the CORESET configured or associated with the CORESETPoolIndex with the value of 0;

a PDSCH transmission of a semi-persistent scheduling (SPS) triggered by the PDCCH transmitted in the CORESET configured or associated with the CORE-SETPoolIndex with the value of 0;

an SPS PDSCH transmission configured or associated with the CORESETPoolIndex with the value of 0; or periodic or semi-persistent CSI-RS resource associated with the CORESETPoolIndex with the value of 0;

wherein the UE is requested to apply information of a spatial filter and/or a pathloss reference signal included in the first TCI state on the transmission of one or more of the following channels or signals;

a physical uplink shared channel (PUSCH) transmission scheduled by a PDCCH transmitted in a CORESET configured or associated with the CORESET-PoolIndex with the value of 0;

a PUSCH transmission of a configured grant that is activated by a downlink control information (DCI) detected in a PDCCH transmitted in the CORESET configured or associated with the CORESETPoolIndex with the value of 0;

a physical uplink control channel (PUCCH) transmission of a configured grant that is associated with the CORESETPoolIndex with the value of 0;

a PUCCH transmission associated with the CORESET-PoolIndex with the value of 0;

a PUCCH transmission that is triggered by a PDCCH transmitted in the CORESET configured or associated with the CORESETPoolIndex with the value of 0;

an SRS transmission that is associated with the CORE-SETPoolIndex with the value of 0; or an AP SRS transmission that is triggered by a PDCCH transmitted in the CORESET configured or associated with the CORESETPoolIndex with the value of 0;

wherein when the UE is indicated with the second TCI state, the UE is requested to apply a QCL information included in the second TCI state on the reception of one or more of the following channels or signals;

a PDCCH transmission in a CORESET configured or associated with the CORESETPoolIndex with the value of 1;

a PDSCH transmission scheduled by a PDCCH transmitted in the CORESET configured or associated with the CORESETPoolIndex with the value of 1;

an AP CSI-RS resource triggered by the PDCCH transmitted in the CORESET configured or associated with the CORESETPoolIndex with the value of 1;

a PDSCH transmission of a SPS triggered by the PDCCH transmitted in the CORESET configured or associated with the CORESETPoolIndex with the value of 1;

an SPS PDSCH transmission configured or associated with the CORESETPoolIndex with the value of 1; or a periodic or semi-persistent CSI-RS resource associated with the CORESETPoolIndex with the value of 1;

or, wherein the UE is requested to apply information of a spatial filter and/or a pathloss reference signal included in the second TCI state on the transmission of one or more of the following channels or signals;

a PUSCH transmission scheduled by a PDCCH transmitted in a CORESET configured or associated with the CORESETPoolIndex with the value of 1;

a PUSCH transmission of a configured grant that is activated by a DCI detected in a PDCCH transmitted in the CORESET configured or associated with the CORESETPoolIndex with the value of 1;

a PUSCH transmission of a configured grant that is associated with the CORESETPoolIndex with the value of 1;

a PUCCH transmission associated with the CORESET-PoolIndex with the value of 1;

a PUCCH transmission that is triggered by a PDCCH transmitted in the CORESET configured or associated with the CORESETPoolIndex with the value of 1;

an SRS transmission that is associated with the CORE-SETPoolIndex with the value of 1; or an AP SRS transmission that is triggered by a PDCCH transmitted in the CORESET configured or associated with the CORESETPoolIndex with the value of 1.

2. The method of claim 1, wherein the one or more reference signals comprise a configuration of a spatial filter for the transmission of the uplink channels or signals.

3. The method of claim 1, wherein each TCI state is associated with a pathloss reference signal for the transmission of the uplink channels or signals.

4. The method of claim 1, wherein the at least one of configuration parameters comprises:

a reference signal providing information for determining a spatial filter for a PUSCH, a PUCCH, or a SRS resource comprising a synchronization signal/physical broadcast channel (SS/PBCH) block, a CSI-RS resource, or a SRS resource; or a reference signal providing a pathloss reference signal for a PUSCH, the PUCCH, or the SRS resource comprising the SS/PBCH block or the CSI-RS resource.

5. The method of claim 1, further comprising determining, by the UE, the TCI state for each channel or reference signal according to an associated TRP.

6. The method of claim 5, wherein when the UE receives a PDCCH, a PDSCH, and/or a CSI-RS resource that is associated with the CORESETPoolIndex with a value of 0, the UE applies the QCL configuration included in the first TCI state, and wherein when the UE transmits a PUSCH, a PUCCH, and/or an SRS resource that is associated with the CORESETPoolIndex with the value of 0, the UE applies the spatial filter and the pathloss reference signal included in the first TCI state.

7. The method of claim 5, wherein when the UE receives a PDCCH, a PDSCH, and/or a CSI-RS resource that is associated with the CORESETPoolIndex with a value of 1, the UE applies the QCL configuration included in the second TCI state, and wherein when the UE transmits the PUSCH, the PUCCH, and/or the SRS resource that is associated with the CORESETPoolIndex with the value of 1, the UE applies the spatial filter and the pathloss reference signal included in the second TCI state.

8. The method of claim 1, wherein the one or more TCI states are configured through DCI or a media access control (MAC) control element (CE).

9. The method of claim 8, wherein the DCI comprises a DCI format 1_1, a DCI format 1_2, a DCI format X1, or a DCI format Y1.

10. The method of claim 9, wherein the DCI format 1_1 or the DCI format 1_2 carrying a DCI field transmission configuration indication, a value of the DCI field transmission configuration indication indicates one TCI state for the UE and the UE applies an indicated TCI state on a PDCCH, a PDSCH, a PUSCH, a PUCCH, a CSI-RS resource, and/or an SRS resource that is associated with the same value of CORESETPoolIndex as the PDCCH carrying the DCI that indicates the TCI state.

11. A wireless communication method by a base station, comprising:

configuring, to a user equipment (UE), a configuration of one or more transmission configuration indicator (TCI) states, wherein each TCI state comprises one or more reference signals for a transmission of downlink channels or signals and/or for a reception of uplink channels or signals; and in each TCI state, providing, to the UE, at least one of configuration parameters;

wherein the method further comprises configuring, to the UE, a configuration of multi-transmission/reception point (TRP) transmission and/or a common TCI state operation mode in the multi-TRP transmission, and wherein the one or more TCI states comprise a first TCI state for TRP associated with CORESETPoolIndex with a value of 0 and/or a second TCI state for TRP associated with the CORESETPoolIndex with a value of 1;

wherein when the base station indicates the first TCI state to the UE, the base station requests the UE to apply a quasi co-location (QCL) information included in the first TCI state on the reception of one or more of the following channels or signals;

a physical downlink control channel (PDCCH) transmission in a control resource set (CORESET) configured or associated with the CORESETPoolIndex with the value of 0;

a physical downlink shared channel (PDSCH) transmission scheduled by a PDCCH transmitted in the CORESET configured or associated with the CORESETPoolIndex with the value of 0;

an access point (AP) channel state information reference signal (CSI-RS) resource triggered by the PDCCH transmitted in the CORESET configured or associated with the CORESETPoolIndex with the value of 0;

a PDSCH transmission of a semi-persistent scheduling (SPS) triggered by the PDCCH transmitted in the CORESET configured or associated with the CORESETPoolIndex with the value of 0;

an SPS PDSCH transmission configured or associated with the CORESETPoolIndex with the value of 0; or a periodic or semi-persistent CSI-RS resource associated with the CORESETPoolIndex with the value of 0;

wherein the base station requests the UE to apply information of a spatial filter and/or a pathloss reference signal included in the first TCI state on the transmission of one or more of the following channels or signals;

a physical uplink shared channel (PUSCH) transmission scheduled by a PDCCH transmitted in a CORE- SET configured or associated with the CORESETPoolIndex with the value of 0;

a PUSCH transmission of a configured grant that is activated by a downlink control information (DCI) detected in a PDCCH transmitted in the CORESET configured or associated with the CORESETPoolIndex with the value of 0;

a physical uplink control channel (PUSCH) transmission of a configured grant that is associated with the CORESETPoolIndex with the value of 0;

a PUCCH transmission associated with the CORESETPoolIndex with the value of 0;

a PUCCH transmission that is triggered by a PDCCH transmitted in the CORESET configured or associated with the CORESETPoolIndex with the value of 0;

an SRS transmission that is associated with the CORESETPoolIndex with the value of 0; or an AP SRS transmission that is triggered by a PDCCH transmitted in the CORESET configured or associated with the CORESETPoolIndex with the value of 0;

wherein when the base station indicates the second TCI state to the UE, the base station requests the UE to apply a QCL information included in the second TCI state on the reception of one or more of the following channels or signals;

a PDCCH transmission in a CORESET configured or associated with the CORESETPoolIndex with the value of 1;

a PDSCH transmission scheduled by a PDCCH transmitted in the CORESET configured or associated with the CORESETPoolIndex with the value of 1;

an AP CSI-RS resource triggered by the PDCCH transmitted in the CORESET configured or associated with the CORESETPoolIndex with the value of 1;

a PDSCH transmission of a SPS triggered by the PDCCH transmitted in the CORESET configured or associated with the CORESETPoolIndex with the value of 1;

an SPS PDSCH transmission configured or associated with CORESETPoolIndex with the value of 1; or a periodic or semi-persistent CSI-RS resource associated with the CORESETPoolIndex with the value of 1;

or, wherein the base station requests the UE to apply information of a spatial filter and/or a pathloss reference signal included in the second TCI state on the transmission of one or more of the following channels or signals;

a PUSCH transmission scheduled by a PDCCH transmitted in a CORESET configured or associated with the CORESETPoolIndex with the value of 1;

a PUSCH transmission of a configured grant that is activated by a DCI detected in a PDCCH transmitted in the CORESET configured or associated with the CORESETPoolIndex with the value of 1;

a PUSCH transmission of a configured grant that is associated with the CORESETPoolIndex with the value of 1;

a PUCCH transmission associated with the CORESETPoolIndex with the value of 1;

a PUCCH transmission that is triggered by a PDCCH transmitted in the CORESET configured or associated with the CORESETPoolIndex with the value of 1;

an SRS transmission that is associated with the CORE-SETPoolIndex with the value of 1; or an AP SRS transmission that is triggered by a PDCCH transmitted in the CORESET configured or associated with the CORESETPoolIndex with the value of 1.

12. A user equipment (UE), comprising:
a memory;
a transceiver; and
a processor coupled to the memory and the transceiver;
wherein the processor is configured to perform operations of:

being configured, by a base station, with a configuration of one or more transmission configuration indicator (TCI) states, wherein each TCI state comprises one or more reference signals for a reception of downlink channels or signals and/or for a transmission of uplink channels or signals; and in each TCI state, being provided with at least one of configuration parameters;

wherein the processor is further configured to perform operations of: being configured, by the base station, with a configuration of multi-transmission/reception point (TRP) transmission and/or a common TCI state operation mode in the multi-TRP transmission, and wherein the one or more TCI states comprise a first TCI state for TRP associated with CORESETPoolIndex with a value of 0 and/or a second TCI state for TRP associated with the CORESETPoolIndex with a value of 1;

wherein when the UE is indicated with the first TCI state, the UE is requested to apply a quasi co-location (QCL) information included in the first TCI state on the reception of one or more of the following channels or signals;

a physical downlink control channel (PDCCH) transmission in a control resource set (CORESET) configured or associated with the CORESETPoolIndex with the value of 0;

a physical downlink shared channel (PDSCH) transmission scheduled by a PDCCH transmitted in the CORESET configured or associated with the CORE-SETPoolIndex with the value of 0;

an access point (AP) channel state information reference signal (CSI-RS) resource triggered by the PDCCH transmitted in the CORESET configured or associated with the CORESETPoolIndex with the value of 0;

a PDSCH transmission of a semi-persistent scheduling (SPS) triggered by the PDCCH transmitted in the CORESET configured or associated with the CORE-SETPoolIndex with the value of 0;

an SPS PDSCH transmission configured or associated with the CORESETPoolIndex with the value of 0; or a periodic or semi-persistent CSI-RS resource associated with the CORESETPoolIndex with the value of 0;

wherein the UE is requested to apply information of a spatial filter and/or a pathloss reference signal included in the first TCI state on the transmission of one or more of the following channels or signals;

a physical uplink shared channel (PUSCH) transmission scheduled by a PDCCH transmitted in a CORE-SET configured or associated with the CORESET-PoolIndex with the value of 0;

a PUSCH transmission of a configured grant that is activated by a downlink control information (DCI)

detected in a PDCCH transmitted in the CORESET configured or associated with the CORESETPoolIndex with the value of 0;

a physical uplink control channel (PUCCH) transmission of a configured grant that is associated with the CORESETPoolIndex with the value of 0;

a PUCCH transmission associated with the CORESET-PoolIndex with the value of 0;

a PUCCH transmission that is triggered by a PDCCH transmitted in the CORESET configured or associated with the CORESETPoolIndex with the value of 0;

an SRS transmission that is associated with the CORE-SETPoolIndex with the value of 0; or an AP SRS transmission that is triggered by a PDCCH transmitted in the CORESET configured or associated with the CORESETPoolIndex with the value of 0;

wherein when the UE is indicated with the second TCI state, the UE is requested to apply a QCL information included in the second TCI state on the reception of one or more of the following channels or signals;

a PDCCH transmission in a CORESET configured or associated with the CORESETPoolIndex with the value of 1;

a PDSCH transmission scheduled by a PDCCH transmitted in the CORESET configured or associated with the CORESETPoolIndex with the value of 1;

an AP CSI-RS resource triggered by the PDCCH transmitted in the CORESET configured or associated with the CORESETPoolIndex with the value of 1;

a PDSCH transmission of a SPS triggered by the PDCCH transmitted in the CORESET configured or associated with the CORESETPoolIndex with the value of 1;

an SPS PDSCH transmission configured or associated the with CORESETPoolIndex with the value of 1; or a periodic or semi-persistent CSI-RS resource associated with the CORESETPoolIndex with the value of 1;

or, wherein the UE is requested to apply information of a spatial filter and/or a pathloss reference signal included in the second TCI state on the transmission of one or more of the following channels or signals;

a PUSCH transmission scheduled by a PDCCH transmitted in a CORESET configured or associated with the CORESETPoolIndex with the value of 1;

a PUSCH transmission of a configured grant that is activated by a DCI detected in a PDCCH transmitted in the CORESET configured or associated with the CORESETPoolIndex with the value of 1;

a PUSCH transmission of a configured grant that is associated with the CORESETPoolIndex with the value of 1;

a PUCCH transmission associated with the CORESET-PoolIndex with the value of 1;

a PUCCH transmission that is triggered by a PDCCH transmitted in the CORESET configured or associated with the CORESETPoolIndex with the value of 1;

an SRS transmission that is associated with the CORE-SETPoolIndex with the value of 1; or an AP SRS transmission that is triggered by a PDCCH transmitted in the CORESET configured or associated with the CORESETPoolIndex with the value of 1.

13. The UE of claim 12, wherein the one or more reference signals comprise a configuration of a spatial filter for the transmission of the uplink channels or signals.

14. The UE of claim 12, wherein each TCI state is associated with a pathloss reference signal for the transmission of the uplink channels or signals.

15. The UE of claim 12, wherein the at least one of configuration parameters comprises:

a reference signal providing information for determining a spatial filter for a PUSCH, a PUCCH, or a SRS resource comprising a synchronization signal/physical broadcast channel (SS/PBCH) block, a CSI-RS resource, or a SRS resource; or a reference signal providing a pathloss reference signal for a PUSCH, the PUCCH, or the SRS resource comprising the SS/PBCH block or the CSI-RS resource.

16. The UE of claim 12, wherein the processor is configured to perform operations of: determining the TCI state for each channel or reference signal according to an associated TRP.

17. The UE of claim 16, wherein when the UE receives a PDCCH, a PDSCH, and/or a CSI-RS resource that is associated with the CORESETPoolIndex with a value of 0, the UE applies the QCL configuration included in the first TCI state, and wherein when the UE transmits a PUSCH, a PUCCH, and/or an SRS resource that is associated with the CORESETPoolIndex with the value of 0, the UE applies the spatial filter and the pathloss reference signal included in the first TCI state.

18. The UE of claim 16, wherein when the UE receives a PDCCH, a PDSCH, and/or a CSI-RS resource that is associated with the CORESETPoolIndex with a value of 1, the UE applies the QCL configuration included in the second TCI state, and wherein when the UE transmits the PUSCH, the PUCCH, and/or the SRS resource that is associated with the CORESETPoolIndex with the value of 1, the UE applies the spatial filter and the pathloss reference signal included in the second TCI state.

19. A base station, comprising:

a memory;

a transceiver; and a processor coupled to the memory and the transceiver;

wherein the processor is configured to perform the method of claim 11.

* * * * *